(12) United States Patent
Bilcai et al.

(10) Patent No.: US 10,308,841 B2
(45) Date of Patent: Jun. 4, 2019

(54) PROCESS AND APPARATUS FOR DETACHING A DISPLAY MODULE BONDED BY A LIQUID OPTICALLY CLEAR ADHESIVE

(71) Applicant: Henkel AG & Co. KGaA, Duesseldorf (DE)

(72) Inventors: Eugen Bilcai, Duesseldorf (DE); Steven Dufresne, Shanghai (CN)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/313,268

(22) PCT Filed: May 30, 2014

(86) PCT No.: PCT/CN2014/078977
§ 371 (c)(1),
(2) Date: Nov. 22, 2016

(87) PCT Pub. No.: WO2015/180156
PCT Pub. Date: Dec. 3, 2015

(65) Prior Publication Data
US 2017/0183541 A1 Jun. 29, 2017

(51) Int. Cl.
*B32B 43/00* (2006.01)
*C09J 5/06* (2006.01)
(Continued)

(52) U.S. Cl.
CPC .................. *C09J 5/06* (2013.01); *B09B 5/00* (2013.01); *B32B 7/12* (2013.01); *B32B 27/06* (2013.01);
(Continued)

(58) Field of Classification Search
CPC ......... Y10T 156/1158; Y10T 156/1917; Y10T 156/1153; Y10T 156/1911; Y10S 156/922;
(Continued)

(56) References Cited

U.S. PATENT DOCUMENTS 5,423,931 A * 6/1995 Inoue .................. H05K 13/0486
156/94
6,156,150 A * 12/2000 Nishida .............. H05K 13/0486
156/701
(Continued)

FOREIGN PATENT DOCUMENTS

CN 1795247 A 6/2006
WO 2013173977 A1 11/2013
(Continued)

OTHER PUBLICATIONS

International Search Report for International PCT Patent Application No. PCT/CN2014/078977 dated Feb. 27, 2015.

*Primary Examiner* — Mark A Osele
(74) *Attorney, Agent, or Firm* — James E. Piotrowski

(57) ABSTRACT

The present invention relates to a process for detaching a component from an electronic assembly. In particular, the present invention relates to a process for detaching a component bonded with a liquid optically clear adhesive (LOCA) in a display module by using electromagnetic radiation (EMR).

10 Claims, 3 Drawing Sheets

(51) Int. Cl.
*B09B 5/00* (2006.01)
*B32B 7/12* (2006.01)
*B32B 27/06* (2006.01)

(52) U.S. Cl.
CPC ........ *B32B 43/006* (2013.01); *B32B 2307/42* (2013.01); *B32B 2315/08* (2013.01); *B32B 2457/20* (2013.01); *B32B 2457/202* (2013.01); *B32B 2457/208* (2013.01); *C09J 2205/302* (2013.01); *C09J 2205/31* (2013.01); *G02F 2203/68* (2013.01); *Y10S 156/922* (2013.01); *Y10S 156/937* (2013.01); *Y10T 156/1153* (2015.01); *Y10T 156/1158* (2015.01); *Y10T 156/1911* (2015.01); *Y10T 156/1917* (2015.01)

(58) Field of Classification Search
CPC ................ Y10S 156/937; B32B 43/006; C09J 2205/302
See application file for complete search history.

(56) References Cited

U.S. PATENT DOCUMENTS

| | | | | |
|---|---|---|---|---|
| 7,498,065 | B2 * | 3/2009 | Siegel | B05D 3/067 250/491.1 |
| 7,754,371 | B2 * | 7/2010 | Suzuki | H01M 8/008 429/49 |
| 7,901,532 | B2 | 3/2011 | Bain et al. | |
| 7,980,448 | B2 * | 7/2011 | Sato | B32B 37/00 228/225 |
| 8,586,204 | B2 * | 11/2013 | Xia | C07F 15/0033 428/690 |
| 8,801,881 | B2 * | 8/2014 | Nonaka | B29D 11/0073 156/350 |
| 8,845,858 | B2 * | 9/2014 | Goto | C09J 4/00 156/712 |
| 8,858,756 | B2 * | 10/2014 | Lee | B32B 38/10 156/705 |
| 9,385,251 | B2 * | 7/2016 | Choi | H01L 31/03044 |
| 2010/0297829 | A1 * | 11/2010 | O'Rourke | H01L 21/6835 438/459 |
| 2012/0034407 | A1 * | 2/2012 | Yamanaka | C09J 4/00 428/40.2 |
| 2013/0174986 | A1 * | 7/2013 | Kurimura | C09J 133/02 156/712 |
| 2013/0269879 | A1 * | 10/2013 | Hirakawa | H01L 21/67051 156/711 |
| 2015/0107762 | A1 * | 4/2015 | Nair | B32B 38/10 156/247 |
| 2016/0279921 | A1 * | 9/2016 | Lolli | C09J 5/00 |

FOREIGN PATENT DOCUMENTS

| | | | |
|---|---|---|---|
| WO | 2014029062 | A1 | 2/2014 |
| WO | WO-2017184079 | A1 * | 10/2017 ........... B32B 43/006 |

* cited by examiner

PROCESS AND APPARATUS FOR DETACHING A DISPLAY MODULE BONDED BY A LIQUID OPTICALLY CLEAR ADHESIVE

TECHNICAL FIELD

The present invention relates to a process for detaching a component from an electronic assembly. In particular, the present invention relates to a process for detaching a component bonded with a liquid optically clear adhesive (LOCA) in a display module by using electromagnetic radiation (EMR).

BACKGROUND

Touch and display modules are usually bonded/laminated using liquid optically clear adhesives. Such modules occasionally need to be repaired to replace defect or damaged components, e.g. the cover glass. In such cases, the component(s) in the touch/display module will be removed and thus the module will be separated. This will facilitate companies to save the cost of the valuable and reusable components, e.g. LCD or OLED that are still functioning properly when the cover glass has been damaged.

To avoid damaging valuable components during the separation process for repairing/detaching them, currently a number of processes have been developed and practiced to rework such modules. One of the most common processes is (heated) wire cutting. In some cases, the entire touch/display module is heated up or cooled down to make the detaching process easier. During such process, mechanical damages from wire cutting or damages due to temperature sensitivity of the components can occur.

Accordingly, major challenges to the conventional detaching/separation processes are how to separate the display modules without or with very low mechanical stress, to avoid conduction or convection heating, to avoid wire cutting and/or twisting of the valuable components and salvage valuable undamaged components.

Therefore, it is the object of the present invention to develop a new detaching process which can overcome at least one of these challenges. These problems are solved by the subject matter of the present invention.

SUMMARY OF THE INVENTION

The subject matter of the present invention is a process for detaching a component from an electronic assembly, comprising the steps of:
(a) providing an apparatus for generating electromagnetic radiation;
(b) transmitting an electromagnetic radiation from the apparatus through an outer component bonded with an inner component by an adhesive;
(c) heating the adhesive by the electromagnetic radiation, and increasing the temperature of the adhesive to from about 50° C. to about 100° C., preferably from about 50° C. to about 80° C. ; and
(d) detaching the components from the electronic assembly.

In one embodiment of the invention, the process further comprises step (c1), between steps (c) and (d), of cooling the adhesive for about 10 to about 30 seconds, which is preferably conducted by placing the electronic assembly in the air at a temperature of about 20° C. to about 25° C.

In another embodiment of the invention, the adhesive in step (c) is an optically clear liquid adhesive.

In yet another embodiment of the invention, the inner component is selected from a liquid crystal display, an organic light-emitting diode display, a plasma display, a light-emitting diode display, an electrophoretic display, and a cathode ray tube display.

In yet another embodiment of the invention, the wavelength of the electromagnetic radiation is from about 200 nm to about 900 nm, preferably from about 420 nm to about 650 nm.

In yet another embodiment of the invention, the intensity of the electromagnetic radiation is from about 0.05 W/cm$^2$ to about 5 W/cm$^2$, preferably from about 0.1 W/cm$^2$ to about 3 W/cm$^2$.

In yet another embodiment of the invention, the duration of the electromagnetic radiation is from about 1 second to about 180 seconds, preferably from about 10 seconds to about 60 seconds.

In yet another embodiment of the invention, the diagonal distance of the inner component is from about 1 inch to about 30 inch, preferably from about 4 inch to about 13 inch.

In yet another embodiment of the invention, the apparatus for generating electromagnetic radiation is selected from a high intensity continuously emitting system, an electroluminescent lamp, an incandescent lamp, a metal halide lamp, LED lamp, high-pressure mercury lamp, xenon lamp, Xenon flash lamp, and an array of light emitting diodes.

A further object of the present invention is a device used for said process for detaching a component from an electronic assembly, comprising an apparatus for generating electromagnetic radiation being absorbed in an adhesive that bonds the component in the electronic assembly during said process. It should be understood that the parameters especially of the apparatus generating electromagnetic radiation, which could be found in the description of the inventive process above and below should complete the disclosure the device described herewith and that therefore reference is made explicitly to this completing information.

In a preferred embodiment, said apparatus comprises at least one light emitting diode used for the generation of electromagnetic radiation. Furthermore, it is advantageous to use a multitude of light emitting diodes preferably arranged in a plane, wherein the light emitting diodes are spaced, preferably in regular intervals to each other.

When using a multitude of light emitting diodes (first light emitting diodes) arranged in a plane it is furthermore advantageous to use at least one additional light emitting diode (second light emitting diode) arranged angularly with regard to said plane of first light emitting diodes. In a preferred embodiment, a multitude of second light emitting diodes is used, wherein said second light emitting diodes are arranged in a plane or a line and are arranged angularly to said plane as described above. Preferably, at least one further light emitting diode (third light emitting diode) is used an arranged at an opposite side to said second light emitting diode(s) as well as arranged angularly with regard to said plane of first light emitting diodes. In a preferred embodiment, a multitude of third light emitting diodes is used, wherein said third light emitting diodes are arranged in a plane or a line and are arranged angularly to said plane as described above.

In a preferred embodiment, the parts of the device surrounding the LEDs and/or parts of the housing of the device are a least partly designed in a way that electromagnetic waves emitted by the light emitting diodes and reflected by e.g. the component are reflected in turn. For example, parts of said device could be made of polished metal like aluminum that can reflect said electromagnetic waves.

Other features and aspects of the subject matter are set forth in greater detail below.

BRIEF DESCRIPTION OF THE FIGURES

A full and enabling disclosure of the present invention is set forth more particularly in the remainder of the specification, including reference to the accompanying figures, in which.

DETAILED DESCRIPTION

Figure 1:
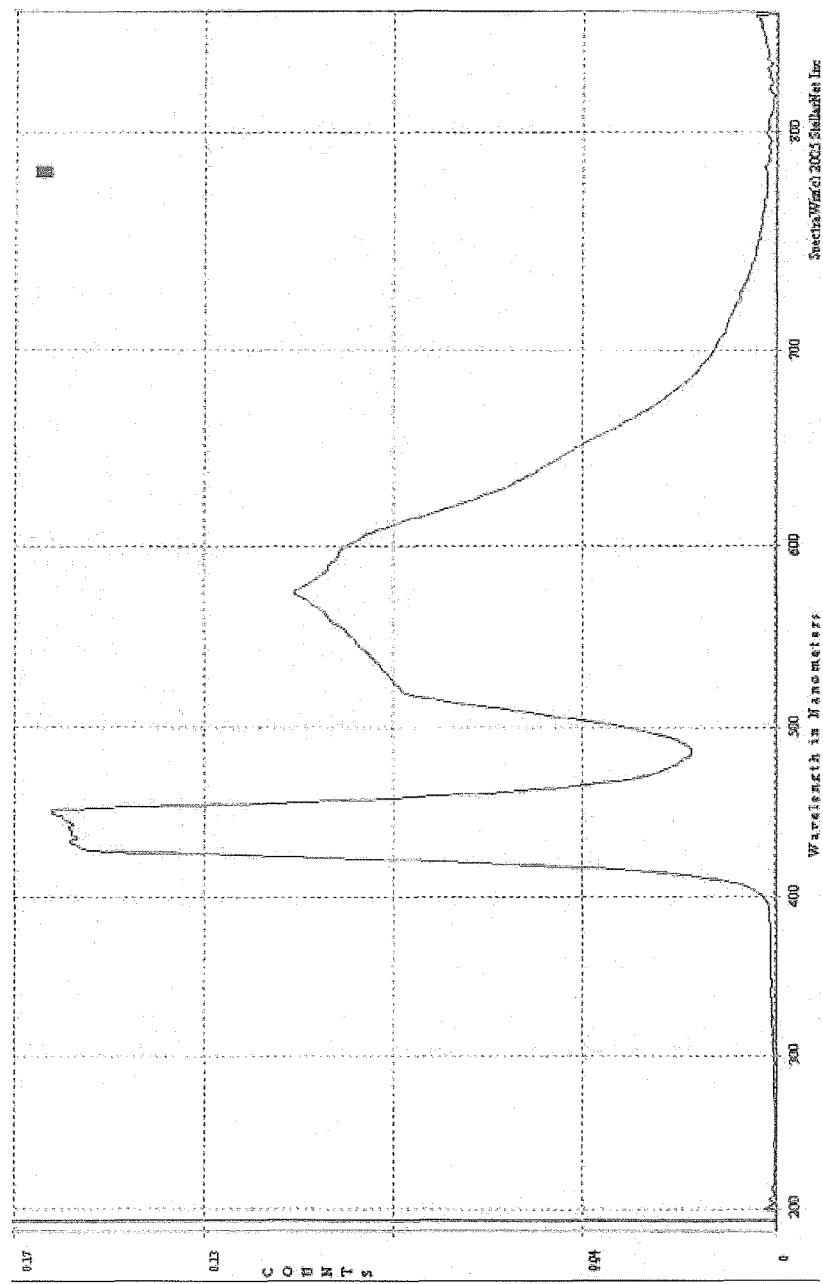
FIG. 1 is a wavelength distribution of the EMR emitted by the EMR source used in the examples of the present invention.

It is to be understood by one of ordinary skill in the art that the present discussion is a description of exemplary embodiments only, and is not intended as limiting the broader aspects of the present invention.

Generally speaking, the present disclosure is directed to a process for detaching a component from an electronic assembly by using EMR. An apparatus for generating EMR or EMR source is provided herein. The photons contained in EMR are capable of initiating electronic excitation within molecules that will cause changes in the bonding/chemistry of the affected molecules. When EMR passes through the outer component of the electronic assembly, EMR is absorbed by the adhesive bonded between the outer component and the inner component. The energy of the EMR waves is converted to heat so that the adhesive absorbing EMR energy is rapidly heated to melt or even ablate. Subsequently, the components can be easily detached. For example, in order to detach the LCD from cover glass bonded by an LOCA in an display module, the EMR is applied from the cover glass side, will be transmitted through cover glass, gets partially absorbed in LOCA but partially transmitted through and will hit the top polarizing film applied onto LCD and will be absorbed as well. Hence the highest temperature is reached in LOCA at the interface to the top polarizer film of the LCD.

The term "a liquid optically clear adhesive" or LOCA as used herein is well established in the art and well known to a person skilled in the art. A variety of liquid optically clear adhesives are widely used in electronic industry, especially for touch panels or display devices to bind the cover glass, plastics or other optical materials, such as clear plastic polymethyl(meth)acrylates to the main sensor unit or to each other. The liquid optically clear adhesive is generally used to improve the optical characteristics of the device as well as improve other attributes such as durability. Some useful applications of using the liquid optically clear adhesive include capacitive touch panels, 3D televisions and glass retarders.

In particular, such adhesive is optically clear if it shows an optical transmission of at least about 85%, preferably at least about 90%. The measurement of the optical transmission is conventional and known to a person skilled in the art. For example, the optical transmission of a liquid optically clear adhesive can be measured on a about 100 µm thick sample according to the following method: a small drop of optically clear adhesive is placed on a 75 mm by 50 mm plain micro slide (a glass slide from Dow Corning, Midland, Mich.), that had been wiped three times with isopropanol and has two about 100 µm thick spacer tapes attached on its two ends. A second glass slide is attached onto the adhesive under a force. Then the adhesive is fully cured under a UV source. The optical transmission is measured from wavelength 380 nm to 780 nm with a spectrometer Cary 300 from Agilent. One blank glass slide is used as the background.

In a particular embodiment of the present invention, the electromagnetic radiation passing through the outer component and absorbed in the adhesive and generating heat has a wavelength from about 200 nm to about 900 nm, preferably from about 420 nm to about 650 nm. Such electromagnetic radiation, in particular UV-radiation or visible light, is provided by using an apparatus for generating EMR or EMR source according to step (a) of the process.

The EMR source used herein includes but not limited to a high intensity continuously emitting system such as those available from Fusion UV Systems, a metal halide lamp, LED lamp, high-pressure mercury lamp, xenon lamp, Xenon flash lamp etc. In a particular embodiment of the present invention, the apparatus for generating EMR is preferably configured as including an array of light emitting diodes (LED).

When the process according to the present invention is applied, the EMR source is positioned close to outer component of electronic device, e.g. the cover glass of a display/touch module typically with an air gap from 1 mm to 5 cm, preferably from 5 to 10 mm. Afterwards, the radiation passes through the cover glass and is transmitted to the liquid optically clear adhesive.

In another particular embodiment of the invention, the intensity of the EMR generated from the EMR source is from about 0.05 W/cm$^2$ to about 5 W/cm$^2$, preferably from about 0.1 W/cm$^2$ to about 3 W/cm$^2$.

In step (c) of the process according to the present invention, the adhesive bonded to the inner component, e.g. LCD is heat by the EMR from the EMR resource, and thus the adhesive is heat to have a temperature of from about 50° C. to about 100° C., preferably about 50° C. to about 80° C.

The intensity of EMR may be changed during the radiation in order to maintain the temperature of the liquid optically clear adhesive. For example, starting from an intensity of 5 W/cm$^2$, when the temperature of the adhesive reaches 80° C.-100° C., the intensity of EMR is decreased to 0.1 W/cm$^2$. In such way, the temperature of the adhesive can be maintained to be constant.

In yet another particular embodiment of the invention, the duration of the radiation by the EMR source is from about 1 second to about 180 seconds, preferably from about 10 seconds to about 60 seconds.

According to the process of the present invention, the heating of the adhesive may be obtained by the stepwise combination of the intensity of EMR source and the EMR duration on the electronic device. For example, the temperature of the adhesive layer can be maintained constant to 75° C. to 80° C. by transmitting the EMR in 3 W/cm$^2$ for 25 seconds, followed by 0.3 W/cm$^2$ for 15 seconds.

In an alternative embodiment of the present invention, the process further comprises step (c1), between steps (c) and (d), of cooling the adhesive for about 10 to about 30 seconds, preferably about 10-20 seconds. Preferably, the cooling step is conducted by placing the electronic assembly in the air at a temperature of room temperature (20° C. to 25° C.).

After the step (c) or (c1) of the present invention, the detachment of the component in step (d) can be conducted either by no mechanical stress or very low mechanical stress.

By no mechanical stress means that the desired component, e.g. the LCD is spontaneously separated from the adhesive and the other component, e.g., the cover glass or polarized film. In addition, by very low mechanical stress means that the desired component, e.g. the LCD can be easily separated from the adhesive and the other component, e.g., the cover glass by hand or cleavage tool such as knife, scissors, clamp or wedge shaped tools, etc. compared to the mechanical stress needed for separating the module untreated or treated by the conventional detaching methods, e.g. heated wire cutting.

In an alternative embodiment of the invention, after detaching the component, e.g. the LCD from the electronic assembly, the remaining liquid optically clear adhesive film still bonded with the outer component may be further cleaned by peeling off from the outer component as disclosed in e.g. WO 2014029062 A1.

Surprisingly, the inventors discovers that by a suitable selection of a variety of processing parameters of the process according to the present invention, including the wavelength, intensity and duration of EMR as well as the temperature of the adhesive absorbing EMR, the adhesive, e.g. the optically clear adhesive used in the electrical device melts or even is ablated to the extent that no or very low mechanical stress is required for subsequent detaching the components, and the preferential release of targeted inner components, e.g. the LCD from the adhesive and other components can be achieved.

The process according to the present invention also possess the advantage that the process is very fast and will not damage the detached component to be reused, e.g. LCD due to the temperature sensitivity compared to the heating method, e.g. heated wire cutting method conventionally used in the prior art.

The process according to the present invention is also safer and more efficient compared to the conventional processes. In the conventional methods, when heat comes from a direct contact source it has to heat the external layer first, and heat is transferred to the deeper layer by conduction. Since heat conduction needs a temperature gradient to proceed, and there is a maximum temperature that can be safely used (around 42° C. without thermal protection gloves), this means lower temperature where warming is needed. Hence the efficiency of the prior art process is much lower than the process according to the present invention.

According to the process of the present invention, the energy emitted by EMR can be easily carried to the required interface even through very thick interface, such as the cover lens of a display module or an air gap (or vacuum). In addition, by selecting suitable combination of parameters, a uniform and if required selective temperature distribution on the whole area of the outer component adhesive can be achieved.

The process and equipment according to the present invention can efficiently be fitted for 3D or complex shaped display modules as well.

Figure 2:
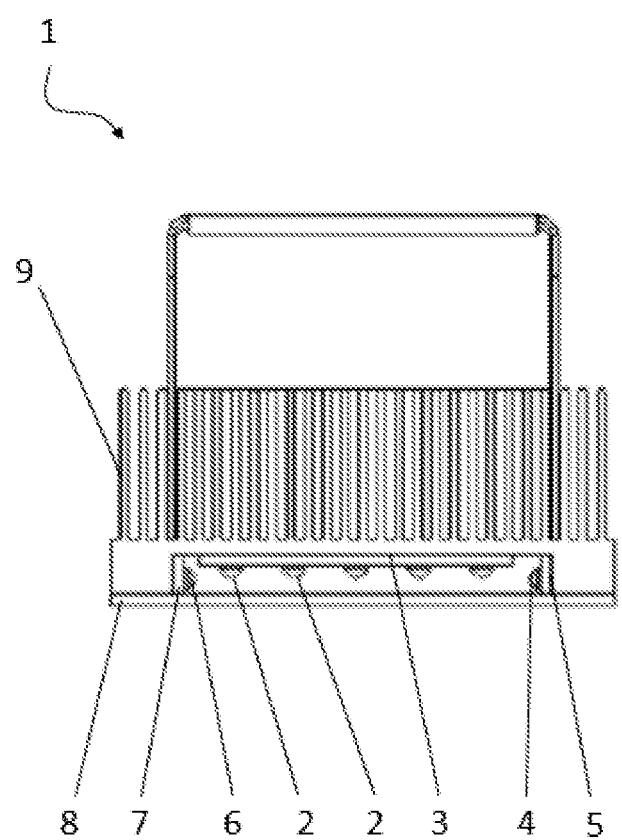
FIGS. 2 and 3 show a device used for said process for detaching a component from an electronic assembly.
Figure 3:
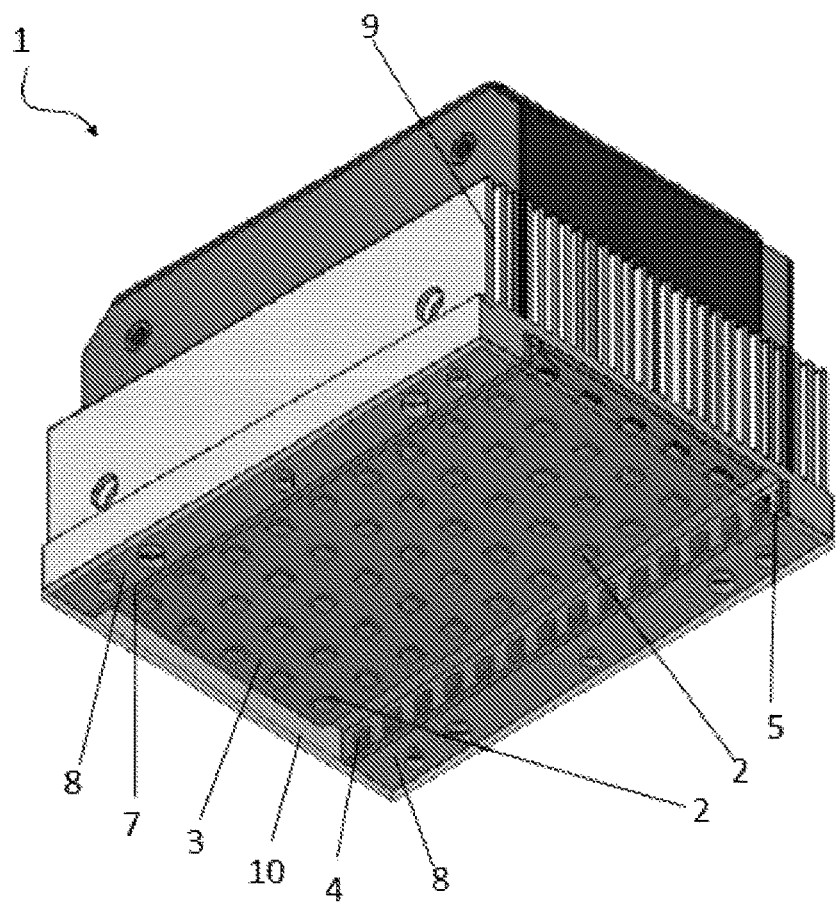

FIGS. 2 and 3 show a device 1 used for said process for detaching a component from an electronic assembly. In the shown embodiment a lens 10 is detached form an electronic assembly, which is not shown. The device 1 comprises a housing and a multitude of cooling fins 9. The device 1 is attached to a lens 10 in a way that the lens 10 is in contact with two plane contact surfaces 8. Furthermore, the device 1 comprises a multitude of first light emitting diodes 2 for generating electromagnetic radiation. These first light emitting diodes 2 are arranged in regular intervals to each other in a plane on a main light emitting diode board 3. The main light emitting board 3 is placed between the two contact surfaces 8, wherein the outer surface of the contact surfaces 8 is at a higher level with regard to the main light emitting diode board 3. Furthermore, second light emitting diodes 4 are arranged on a right side light emitting diode board 5 in regular intervals to each other, wherein the right side light emitting diode board 5 is arranged angularly to the main light emitting diode board 3. In the shown embodiment, the right side light emitting diode board 5 is arranged perpendicular to the to the main light emitting diode board 3 on the side wall of the right contact surface 8. On the opposite side to the right side light emitting diode board 5 further third light emitting diodes 6 are arranged on a left side light emitting diode board 7 in regular intervals to each other, wherein the left side light emitting diode board 7 is arranged angularly to the main light emitting diode board 3. In the shown embodiment, the left side light emitting diode board 7 is arranged perpendicular to the to the main light emitting diode board 3 on the side wall of the left contact surface 8. The parts of the boards 3, 5, 7 surrounding the respective light emitting diodes 2, 4, 6 are a least partly designed in a way that electromagnetic waves emitted by the light emitting diodes 2, 4, 6 and reflected by the lens 10 are reflected in turn. Furthermore parts of the housing and also the contact surface 8 for the lens 10 are made of polished aluminium to reflect the electromagnetic waves in turn reflected by the lens 10.

The present invention may be better understood with reference to the following examples.

EXAMPLES

Example 1

A display module having a 4.3 in LCD, laminated with a layer of cured re-workable liquid optically clear adhesive between the cover lens and LCD module was tested in this example. The cover lens of the laminated display module was fixed into a jig. An EMR from the EMR source including a LED array in the range of visible light of 420 nm to 650 nm as shown in FIG. 1 was applied from the lens side with an intensity of 3 W/cm$^2$, and the air gap between the cover lens and the EMR source is of 5 mm. The EMR passed through the cover lens and was transmitted to the optically clear adhesive bonded between the cover lens and LCD module. The absorption was highest when the light reached the top polarizing film applied onto the LCD. The temperature was maintained constant to 75° C. to 80° C. by adjusting the intensity of the EMR source according to the following program: 3 W/cm$^2$ for 25 seconds, followed by 0.3 W/cm$^2$ for 15 seconds.

While the temperature was maintained constant, the LCD module was separated using a very low mechanical cleavage created by a special wedge shaped tool inserted at one corner of the display module. The LCD module is successfully detached from the cover lens, and the surfaces of the LCD module and cover lens both contain adhesive residues.

Example 2

A display module having a 4.3 in LCD, laminated with a layer of cured re-workable liquid optically clear adhesive between the cover lens and LCD module was tested in this example. The cover lens of the laminated display module was fixed into a jig. An EMR from the EMR source including a LED array in the range of visible light of 420 nm to 650 nm as shown in FIG. 1 was applied from the lens side with an intensity of 3 W/cm$^2$, and the air gap between the cover lens and the EMR source is of 5 mm. The EMR passed through the cover lens and was transmitted to the optically clear adhesive bonded between the cover lens and LCD module. The absorption was highest when the light reached the top polarizing film applied onto the LCD. The temperature was maintained constant to 75° C. to 80° C. by adjusting the intensity of the EMR source according to the following program: 3 W/cm² for 25 seconds, followed by 0.3 W/cm² for 15 seconds.

After EMR was interrupted and the display module was allowed to place in the air at room temperature (20° C. to 25° C.) for 20 seconds, the LCD module was separated using a very low mechanical cleavage created by a special wedge shaped tool inserted at one corner of the display module.

During 20 seconds cooling time heat dissipation took place from outside to inside. The highest temperature in the optically clear adhesive layer was maintained at the interface between the adhesive and the top polarizing film, so that the LCD was successfully separated from the cover lens without any adhesive residues on the LCD surface by visual inspection, and the adhesive only stays on the cover lens.

As shown in the Examples 1 and 2, according to the processes of the present invention, an easier detachment of the LCD from the cover glass in a display module by means of very low mechanical stress can be achieved. Surprisingly, in the process of Example 2 including the cooling step, and the preferential release interface between the adhesive and LCD was achieved, and no adhesive was left on the surface of the resulting LCD in Example 2.

These and other modifications and variations of the present invention may be practiced by those of ordinary skill in the art, without departing from the spirit and scope of the present invention. In addition, it should be understood that aspects of the various embodiments may be interchanged both in whole or in component. Furthermore, those of ordinary skill in the art will appreciate that the foregoing description is by way of example only, and is not intended to limit the invention so further described in such appended claims.

LIST OF REFERENCE SIGNS

| | |
|---|---|
| 1 | Device |
| 2 | First light emitting diodes |
| 3 | Main light emitting diode board |
| 4 | Second light emitting diodes |
| 5 | Right side light emitting diode board |
| 6 | Third light emitting diodes |
| 7 | Left side light emitting diode board |
| 8 | Housing |
| 9 | Cooling fin |
| 10 | lense |

What is claimed is:

1. A process for detaching a component from an electronic assembly, comprising the steps of:
   (a) providing an apparatus for generating electromagnetic radiation;
   providing the electronic assembly comprising an outer component bonded to an inner component by an optically clear adhesive;
   (b) transmitting electromagnetic radiation at a first intensity for a first time from the apparatus through the outer component to the adhesive;
   (c) heating the adhesive by transmission of the first intensity of the electromagnetic radiation to increase the temperature of the adhesive to about 50° C. to about 100° C.;
   (d) after the adhesive has been heated to the temperature of about 50° C. to about 100° C., transmitting electromagnetic radiation at a second intensity for a second time from the apparatus to the adhesive to maintain the adhesive at a temperature of about 50° C. to about 100° C., wherein the second intensity is lower than the first intensity;
   (e) cooling the adhesive; and thereafter
   (f) detaching the components from the electronic assembly.

2. The process according to claim 1, wherein step (e) of cooling comprises cooling the adhesive for 10 to 30 seconds.

3. The process according to claim 1, wherein the inner component is selected from a liquid crystal display, an organic light-emitting diode display, a plasma display, a light-emitting diode display, an electrophoretic display, and a cathode ray tube display.

4. The process according to claim 1, wherein the wavelength of the transmitted electromagnetic radiation is from 420 nm to about 650 nm.

5. The process according to claim 1, wherein the first and second intensity of the transmitted electromagnetic radiation is from 0.05 W/cm² to 5 W/cm².

6. The process according to claim 1, wherein the duration of the electromagnetic radiation is from 1 second to 180 seconds.

7. The process according to claim 1, wherein the inner component has a diagonal length from 1 inch to 30 inches.

8. The process according to claim 1, wherein the apparatus for generating electromagnetic radiation is selected from a high intensity continuously emitting system, an electroluminescent lamp, an incandescent lamp, a metal halide lamp, LED lamp, high-pressure mercury lamp, Xenon lamp, Xenon flash lamp, and an array of light emitting diodes.

9. The process according to claim 1, wherein the apparatus for generating electromagnetic radiation is an array of light emitting diodes.

10. A process for detaching a component from an electronic assembly, comprising the steps of:
   (a) providing an apparatus for generating electromagnetic radiation;
   providing the electronic assembly comprising an outer component bonded to an inner component by an optically clear adhesive;
   (b) transmitting electromagnetic radiation at a first intensity for a first time from the apparatus through the outer component to the adhesive;
   (c) heating the adhesive by transmission of the first intensity of the electromagnetic radiation to increase the temperature of the adhesive to about 50° C. to about 100° C.;
   (d) after the adhesive has been heated to the temperature of about 50° C. to about 100° C., transmitting electromagnetic radiation at a second intensity for a second time from the apparatus to the adhesive to maintain the adhesive at a temperature of about 50° C. to about 100° C., wherein the second intensity is lower than the first intensity;
   (e) transmitting electromagnetic radiation at a third intensity for a third time from the apparatus to the adhesive followed by transmitting electromagnetic radiation at a fourth intensity for a fourth time from the apparatus to the adhesive; wherein the third intensity is higher than the fourth intensity and both the third intensity and the fourth intensity are lower than the first intensity; and (f) detaching the components from the electronic assembly.

\* \* \* \* \*